United States Patent [19]
Hiraizumi

[11] Patent Number: 5,793,411
[45] Date of Patent: Aug. 11, 1998

[54] VIDEO-ON-DEMAND SYSTEM

[75] Inventor: Maki Hiraizumi, Kawasaki, Japan

[73] Assignee: Fujitsu Limited, Kanagawa, Japan

[21] Appl. No.: 594,498

[22] Filed: Jan. 31, 1996

[30] Foreign Application Priority Data

Jun. 6, 1995 [JP] Japan .................... 7-139541

[51] Int. Cl.⁶ .................................. H04N 7/10
[52] U.S. Cl. .................. 348/7; 348/6; 348/12; 348/13; 348/17; 348/11; 455/5.1; 455/6.1; 455/6.21
[58] Field of Search ..................... 348/7, 12, 13, 348/17, 6, 10, 11, 525, 529, 532, 545, 607; 455/4.2, 5.1, 6.1, 6.2, 6.3; H04N 7/10

[56] References Cited

U.S. PATENT DOCUMENTS

| | | | |
|---|---|---|---|
| 4,553,161 | 11/1985 | Citta | 348/10 |
| 4,975,771 | 12/1990 | Kassatly | 348/6 |
| 5,177,604 | 1/1993 | Martinez | 348/13 |
| 5,231,665 | 7/1993 | Auld et al. | 348/4 |
| 5,361,394 | 11/1994 | Shigihara | 455/5.1 |
| 5,371,535 | 12/1994 | Takizawa | 348/15 |
| 5,412,720 | 5/1995 | Hoarty | 348/13 |
| 5,483,277 | 1/1996 | Granger | 455/4.2 |
| 5,512,934 | 4/1996 | Kochanski | 348/13 |
| 5,528,582 | 6/1996 | Bodeep et al. | 455/5.1 |
| 5,541,757 | 7/1996 | Fuse et al. | 348/7 |
| 5,606,725 | 2/1997 | Hart | 348/12 |

*Primary Examiner*—John K. Peng
*Assistant Examiner*—Linus H. Lo
*Attorney, Agent, or Firm*—Helfgott & Karas, P.C.

[57] ABSTRACT

A video-on-demand system is comprised of a source station which transmits video signals of different channels on an optical transmission line to a number of subscriber terminals in accordance with subscriber requests. The source station includes a multiplexing unit which generates a frequency division multiplexed signal from the video signals in such a manner that vertical synchronizations of the video signals of different channels are in accordance with each other, and transmits the multiplexed signal to each subscriber terminal. Each subscriber terminal includes a transmitting unit which transmits a control signal indicative of a subscriber request to the source station at a frequency band different from frequency bands of the video signals of the frequency division multiplexed signal, the control signal being transmitted during a vertical blanking period of the video signals.

7 Claims, 11 Drawing Sheets

VIDEO-ON-DEMAND SYSTEM

BACKGROUND OF THE INVENTION

(1) Field of the Invention

The present invention generally relates to a video-on-demand system, and more particularly to a video-on-demand system which provides a video-on-demand service by transmitting signals from a source station on an optical transmission line to subscriber terminals.

(2) Description of the Related Art

An optical CATV (community antenna television) system which uses an optical fiber cable as an optical transmission line has been proposed. It is desired that the optical CATV system enables a long-distance, high-quality video-on-demand (VOD) service for the subscribers.

A distance of transmission of the above optical CATV system is greater than a distance of transmission of a conventional CATV system which uses a coaxial cable as the transmission line. Since the optical CATV system does not produce electromagnetic induction when signals are transmitted, the quality of the signals transmitted in the optical CATV system is better than the quality of the signals transmitted in the coaxial-cable CATV system.

In the above optical CATV system, an optical coupler is connected with the optical transmission line to distribute optical signals from the optical transmission line over subscriber terminals.

When a video-on-demand (VOD) service is performed by the optical CATV system, it is necessary that video signals of different channels from a CATV station are distributed over a number of subscriber terminals in accordance with individual requests of the subscribers. In order to reduce the cost of the optical CATV system, it is desirable to realize a bi-directional transmission of upward signals (e.g., request signals from the subscriber terminals to the CATV station) and downward signals (e.g., video signals from the CATV station to the subscriber terminals) on the optical transmission line.

In order to carry out the above-mentioned bi-directional transmission of the signals, it is conceivable that one of the following multiplexing methods be applied to the above optical CATV system.

(A) TCM (time compression multiplexing) in which upward signals and downward signals are multiplexed at time divisions.

(B) WDM (wavelength division multiplexing) in which upward signals and downward signals are multiplexed at wavelength divisions.

(C) DDM (direction division multiplexing) method in which upward signals and downward signals are bi-directionally transmitted at the same wavelength and at the same time.

(D) FDM (frequency division multiplexing) method in which upward signals and downward signals are multiplexed at frequency divisions.

Regarding the above TCM method, when the amount of transmission data per subscriber is relatively small, the TCM method may be implemented in the optical CATV system. However, when the amount of transmission data per subscriber is great, it is very difficult to implement the TCM method in the optical CATV system which is suitable for practical use.

When the above WDM method is used, for example, downward signals and upward signals are multiplexed at a wavelength of 1.3 μm and at a wavelength of 1.5 μm respectively. To implement the WDM method in the optical CATV system, additional optical parts are required to separate optical signals from the wavelength division multiplexed signal on the optical transmission line, so that the separate optical signals are supplied to individual subscribers. These optical parts are expensive, and the cost of the optical CATV system when the WDM method is implemented becomes high.

Regarding the above DDM method, it is theoretically possible to implement the DDM method in the optical CATV system. However, when the DDM method is used, a reflection of signals on the optical transmission line takes place. Thus, upward signals and downward signals on the optical transmission line interfere with each other, which causes the degradation of optical signals. It is very difficult to implement the DDM method in the optical CATV system which is suitable for practical use.

When the above FDM method is used, for example, video signals which are the downward signals are modulated at a frequency band of 100–550 MHz, and digital NRZ (nonreturn to zero) signals at a bit rate of 10–50 Mbps (megabits per second) which are the upward signals are modulated at a frequency band below 100 MHz. The cost of the optical CATV system in which the FDM method is implemented in the above-mentioned manner can be reasonably low.

However, as a mixed modulation of the frequency division multiplexed signal including the NRZ signals and the video signals takes place, it is unavoidable that the quality of the demodulated video signals be degraded when the above FDM method is used.

SUMMARY OF THE INVENTION

An object of the present invention is to provide an improved optical CATV system in which the above-described problems are eliminated.

Another object of the present invention is to provide a video-on-demand CATV system which is constructed with a low cost and provides a video-on-demand service for subscriber terminals by efficiently transmitting a frequency division multiplexed signal on an optical transmission line.

Still another object of the present invention is to provide a video-on-demand CATV system in which the degradation of the quality of motion picture on the subscriber terminals due to the mixed modulation of the multiplexed signal is effectively prevented.

The above-mentioned objects of the present invention are achieved by a video-on-demand system in which video signals of different channels from a source station are transmitted on an optical transmission line to a number of subscriber terminals in accordance with subscriber requests, the video-on-demand system including: a multiplexing unit, provided in the source station, generating a frequency division multiplexed signal from the video signals in such a manner that vertical synchronizations of the video signals of different channels are in accordance with each other, and transmitting the frequency division multiplexed signal to each subscriber terminal; and a transmitting unit, provided in each subscriber terminal, transmitting a control signal indicative of a subscriber request to the source station at a frequency band different from frequency bands of the video signals of the frequency division multiplexed signal, the transmitting unit transmitting the control signal during a vertical blanking period of the video signals.

The video-on-demand system of the present invention efficiently transmits a frequency division multiplexed signal on the optical transmission line to provide the video-on-demand service. The video-on-demand system of the present invention can be constructed with a low cost. The video-on-demand system of the present invention effectively prevents the degradation of the quality of motion picture on the subscriber terminals due to the mixed modulation of the multiplexed signal.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENT

A description will now be given of the preferred embodiment of the present invention with reference to the accompanying drawings.

Figure 1:
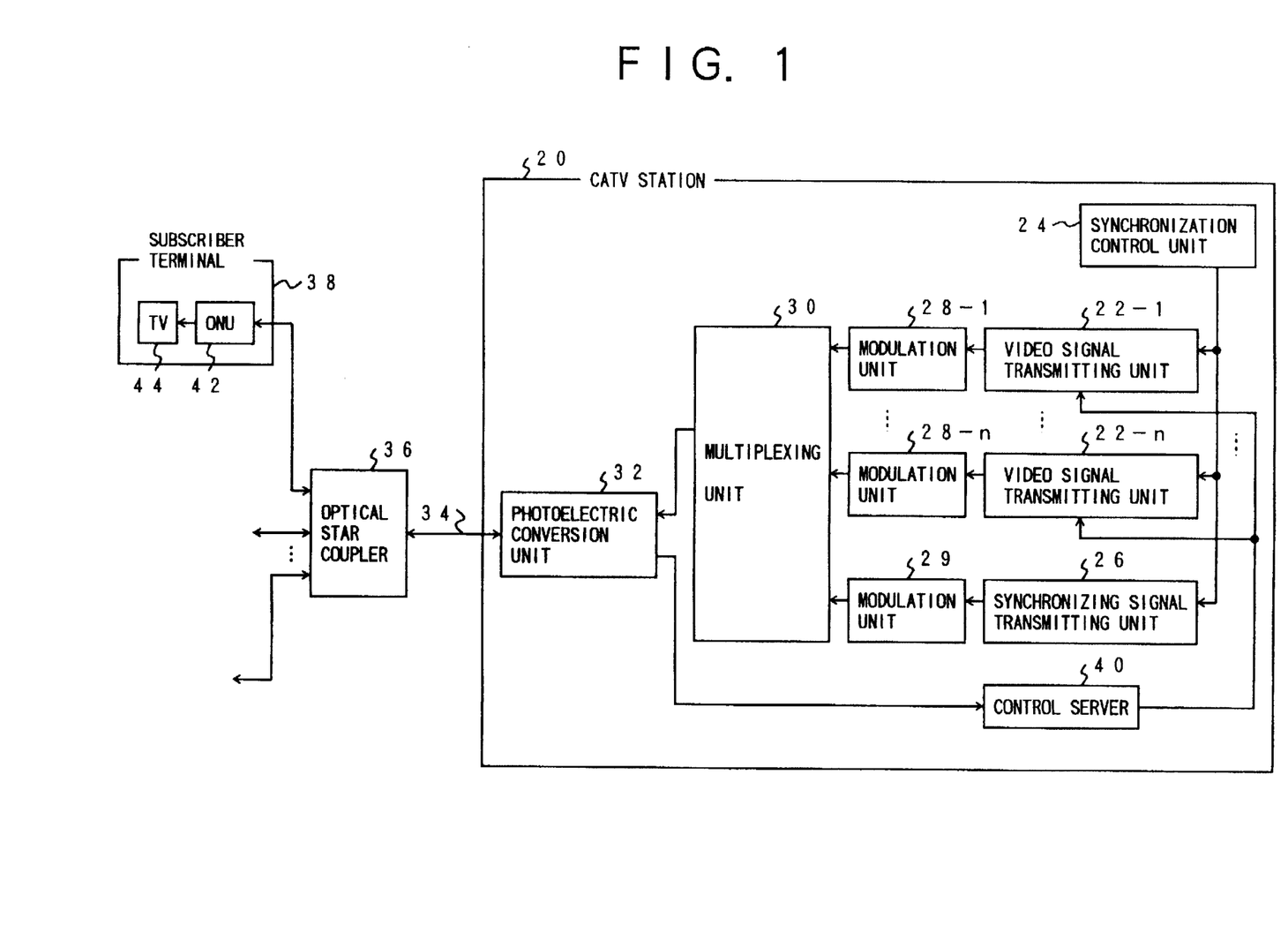
FIG.1 is a block diagram of a community antenna television (CATV) station to which an embodiment of the present invention is applied.

FIG.1 shows a CATV (community antenna television) station 20 to which the embodiment of the present invention is applied.

Referring to FIG.1, a number of video signal transmitting units 22-1 through 22-n are included in the CATV station 20. Video signal reproducing units such as video tape recorders or laser disk units are used as the video signal transmitting units 22-1 through 22-n. The video signal transmitting units 22-1 through 22-n operate in synchronization according to a reference vertical synchronizing signal from a synchronization control unit 24. The vertical synchronizations of the video signals from the video signal transmitting units 22-1 through 22-n are in accordance with each other.

The reference vertical synchronizing signal from the synchronization control unit 24 is also input to a synchronizing signal transmitting unit 26. The synchronizing signal transmitting unit 26 generates an upward control synchronizing signal from the reference vertical synchronizing signal. This upward control synchronizing signal has a frequency that is 1/N of a frequency of the reference vertical synchronization signal, where N is a number greater than the number of subscriber terminals connected with the CATV station 20. The upward control synchronizing signal is used by each subscriber terminal as the reference to count the vertical synchronizing signals.

The video signals from the video signal transmitting units 22-1 through 22-n and the upward control synchronizing signal from the synchronizing signal transmitting unit 26 are input to modulation units 28-1 through 28-n and a modulation unit 29, respectively. These signals are subjected to frequency modulation at the modulation units 28-1 through 28-n and 29. Carrier waves on which the video signals and the upward control synchronizing signal are modulated have different frequencies with 6-MHz stepped differences. A multiplexing unit 30 generates a frequency division multiplexed (FDM) signal from the modulated video signals and the modulated synchronizing signal. The FDM signal from the multiplexing unit 30 is converted into an optical signal by a photoelectric conversion unit 32. This optical signal is transmitted on an optical transmission line 34 as the downward optical signal to the subscriber terminals.

Referring to FIG.1, the ONU 42 of each subscriber terminal is connected with the CATV station 20 via the optical transmission line 34. The optical transmission line 34 is an optical fiber cable. An optical star coupler 36 is connected at the end of the optical transmission line 34 to distribute downward optical signals from the optical transmission line 34 over a number of subscriber terminals.

Also, upward optical signals from the subscriber terminals are transmitted on the optical transmission line 34 to the CATV station 20. The upward optical signals are converted to electric signals by the photoelectric conversion unit 32 in the CATV station 20. The electric signals from the photoelectric conversion unit 32 are transferred to a control server 40. The control server 40 separates the control burst signals from the electric signals and decodes the control burst signals, the decoded control burst signals being indicative of the requests of the subscribers. The control server 40 controls the video signal transmitting units 22-1 through 22-n in accordance with the requests indicated by the decoded control burst signals.

Figure 2:
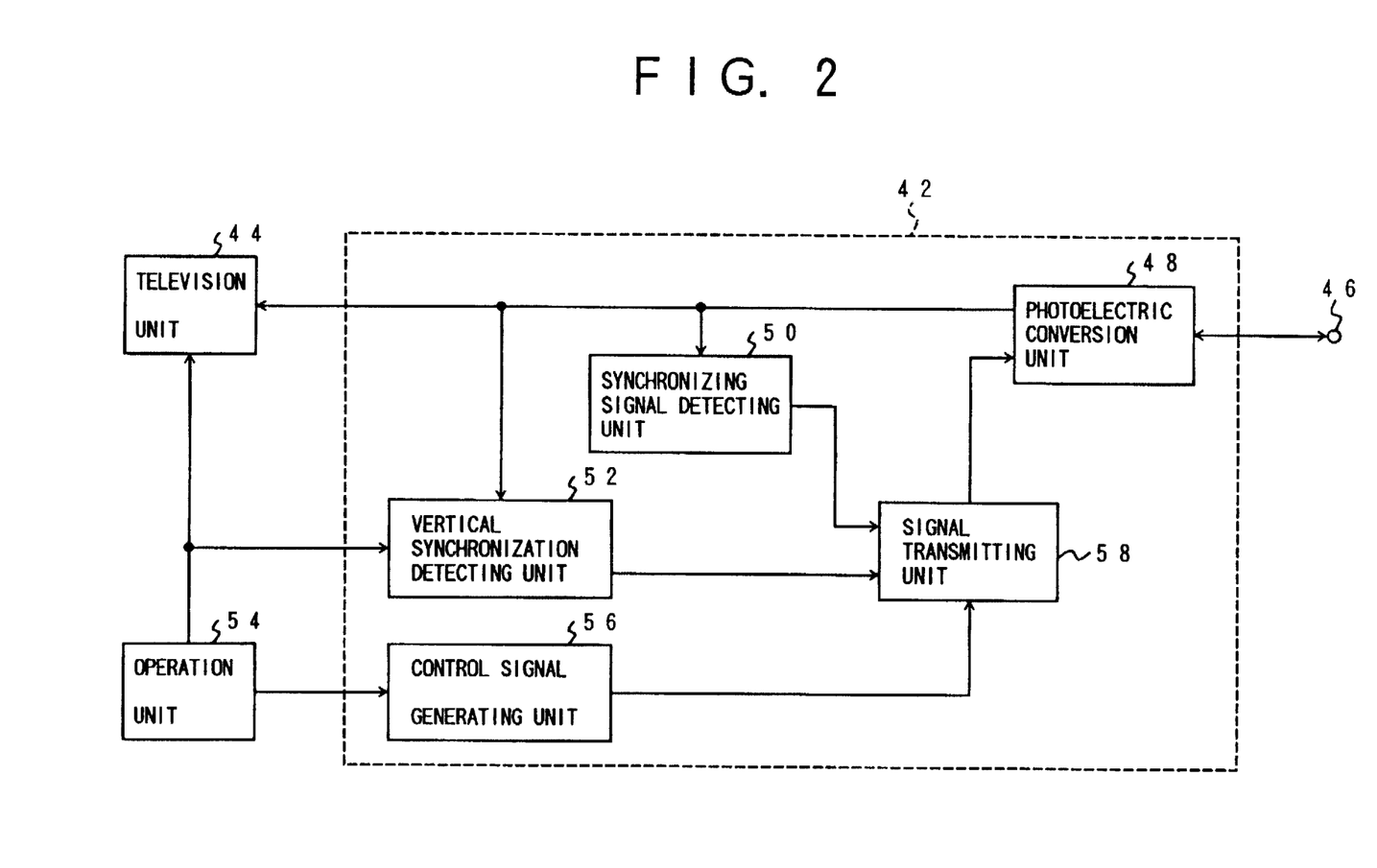
FIG.2 is a block diagram of an optical network unit (ONU) of each subscriber terminal to which the embodiment of the present invention is applied.

FIG.2 shows an optical network unit (ONU) 42 of each subscriber terminal to which the embodiment of the present invention is applied.

Referring to FIG.2, the subscriber terminal includes the optical network unit (ONU) 42, a television unit 44, and an operation unit 54. A downward optical signal from the optical star coupler 36 is input from a terminal 46 to the ONU 42. In the ONU 42, the downward optical signal is input to a photoelectric conversion unit 48. The photoelectric conversion unit 48 converts the downward optical signal into an electric frequency division multiplexed (FDM) signal. In the ONU 42, the FDM signal from the photoelectric conversion unit 48 is transferred to each of the television unit 44, a synchronizing signal detecting unit 50, and a vertical synchronization detecting unit 52.

The television unit 44 selects a modulated signal, tuned to a specific frequency band (channel), from the FDM signal from the photoelectric conversion unit 48, the frequency band being specified by an operation signal from the operation unit 54. The television unit 44 demodulates the selected modulated signal so that a motion picture is output in accordance with the demodulated signal.

The synchronizing signal detecting unit 50 selects a modulated signal in synchronism with an upward control synchronizing signal, from the FDM signal from the photoelectric conversion unit 48. The synchronizing signal detecting unit 50 demodulates the selected modulated signal, and the demodulated signal from the synchronizing signal detecting unit 50 is transferred to a signal transmitting unit 58.

The vertical synchronization detecting unit 52 selects a modulated signal, tuned to the frequency band (channel), from the FDM signal from the photoelectric conversion unit 48, the frequency band being specified by the operation signal from the operation unit 54. The vertical synchronization detecting unit 52 demodulates the selected modulated signal, and separates a vertical synchronizing signal from the demodulated video signal. The vertical synchronizing signal from the vertical synchronization detecting unit 52 is transferred to the signal transmitting unit 58.

A request related to the video-on-demand (VOD) service is input by the subscriber on the operation unit 54. In the ONU 42, a control signal generating unit 56 receives a request signal from the operation unit 54 and generates a control signal having a predetermined format in accordance with the request signal from the operation unit 54. The control signal from the control signal generating unit 56 is transferred to the signal transmitting unit 58.

The signal transmitting unit 58 uses the upward control synchronizing signal as the reference, and starts counting the vertical synchronizing signals. When a count value of the vertical synchronizing signals reaches a predetermined value of the subscriber terminal, the signal transmitting unit 58 converts the control signal from the control signal generating unit 56 into a digital NRZ (nonreturn to zero) signal. The NRZ signal is processed through a lowpass filter so that the frequency band of the NRZ signal is restricted below a frequency of 50 MHz. The signal transmitting unit 58 generates such a control burst signal from the NRZ signal, and transfers the control burst signal to the photoelectric conversion unit 48.

The photoelectric conversion unit 48 converts the control burst signal from the signal transmitting unit 58 into an optical signal. This optical signal is transmitted on the optical transmission line 34 from the terminal 46 to the CATV station 20.

Figure 3:
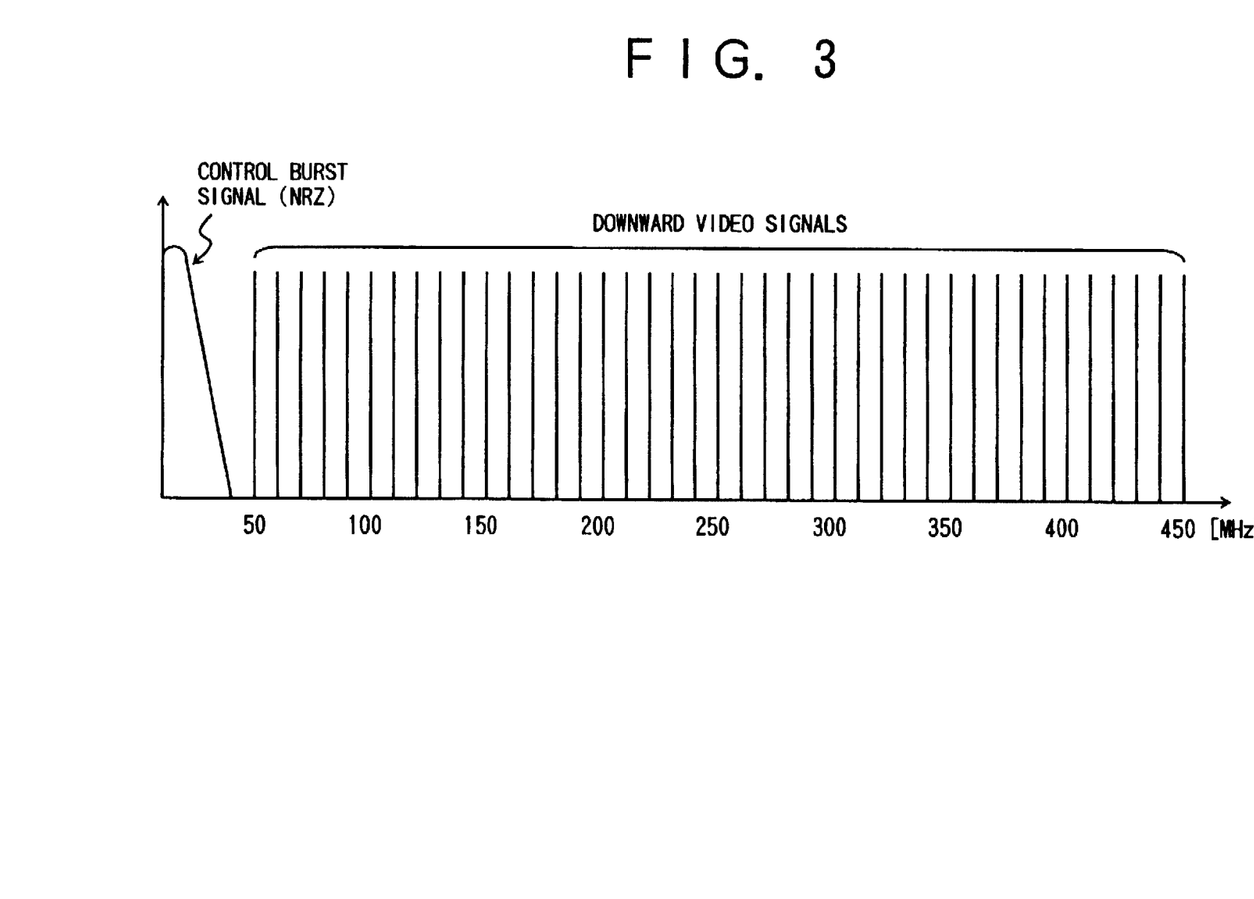
FIG.3 is a diagram for explaining a frequency spectrum of signals used in the video-on-demand (VOD) system of the present invention.

FIG.3 shows a frequency spectrum of signals used in the video-on-demand system of the present embodiment. Referring to FIG.3, the video signals transmitted from the CATV station to the subscriber terminals are allocated to a range of frequencies above 50 MHz, and the video signals of different frequency bands are at intervals of 6 MHz. The control burst signal (the NRZ signal) transmitted from each subscriber terminal to the CATV station is allocated to a range of frequencies below 50 MHz.

Figure 4:
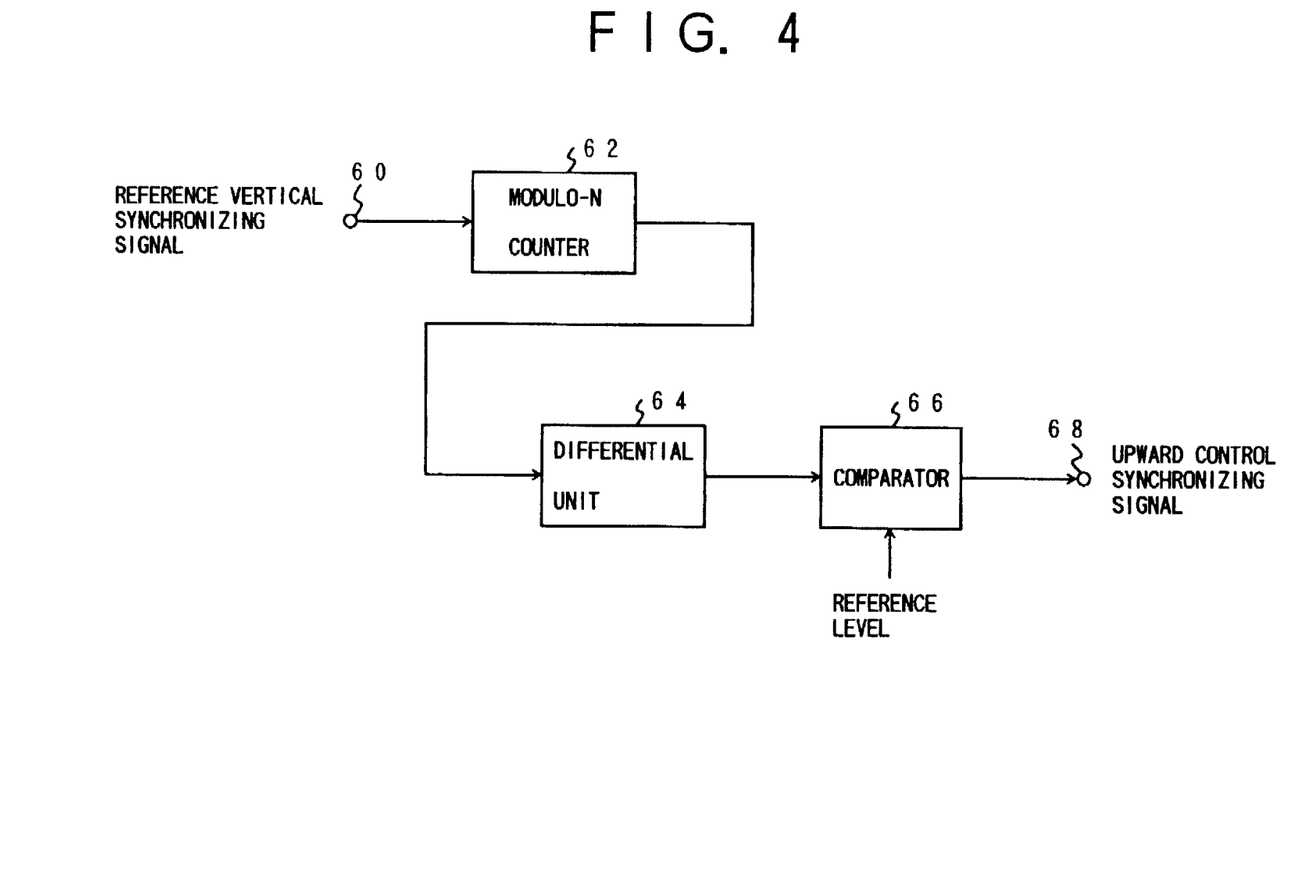
FIG.4 is a block diagram of a synchronizing signal transmitting unit of the CATV station in FIG.1.

FIG.4 shows a synchronizing signal transmitting unit 26 of the CATV station 20 in FIG. 1. Referring to FIG.4, the reference vertical synchronizing signal from the synchronization control unit 24 is input from a terminal 60 to the synchronizing signal transmitting unit 26. A modulo-N counter 62 divides an input frequency of the vertical synchronizing signal by "N" and outputs a pulse signal with a duty ratio 50%. A differential unit 64 generates a differential signal of the pulse signal from the modulo-N counter 62. A comparator unit 66 compares the differential signal with a reference level, and generates an upward control synchronizing signal. The upward control synchronizing signal has a small pulsewidth, and it is sent at a timing corresponding to a timing of the rising edge of the above pulse signal. The upward control synchronizing signal from the comparator unit 66 is output from a terminal 68 to the modulation unit 29.

Figure 5:
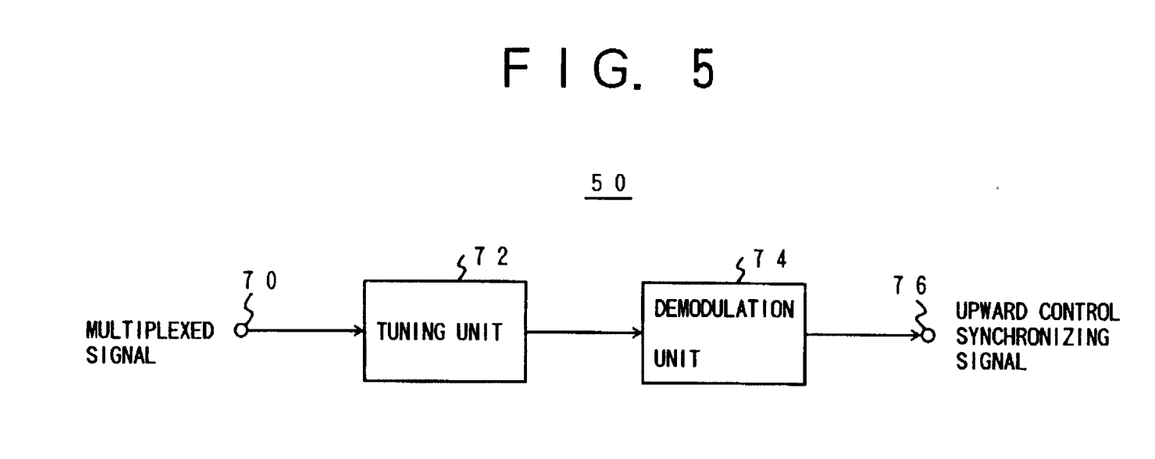
FIG.5 is a block diagram of a synchronizing signal detecting unit of the ONU in FIG.2.

FIG.5 shows a synchronizing signal detecting unit 50 of the ONU 42 in FIG.2. Referring to FIG.5, the frequency division multiplexed (FDM) signal from the photoelectric conversion unit 48 is input from a terminal 70 to the synchronizing signal detecting unit 50. A tuning unit 72 selects a modulated signal, tuned to a specific frequency band (channel), from the FDM signal from the terminal 70. A demodulation unit 74 demodulates the selected modulated signal from the tuning unit 72, and outputs the upward control synchronizing signal to a terminal 76. The upward control synchronizing signal from the terminal 76 is transferred to the signal transmitting unit 58 in FIG.2.

Figure 6:
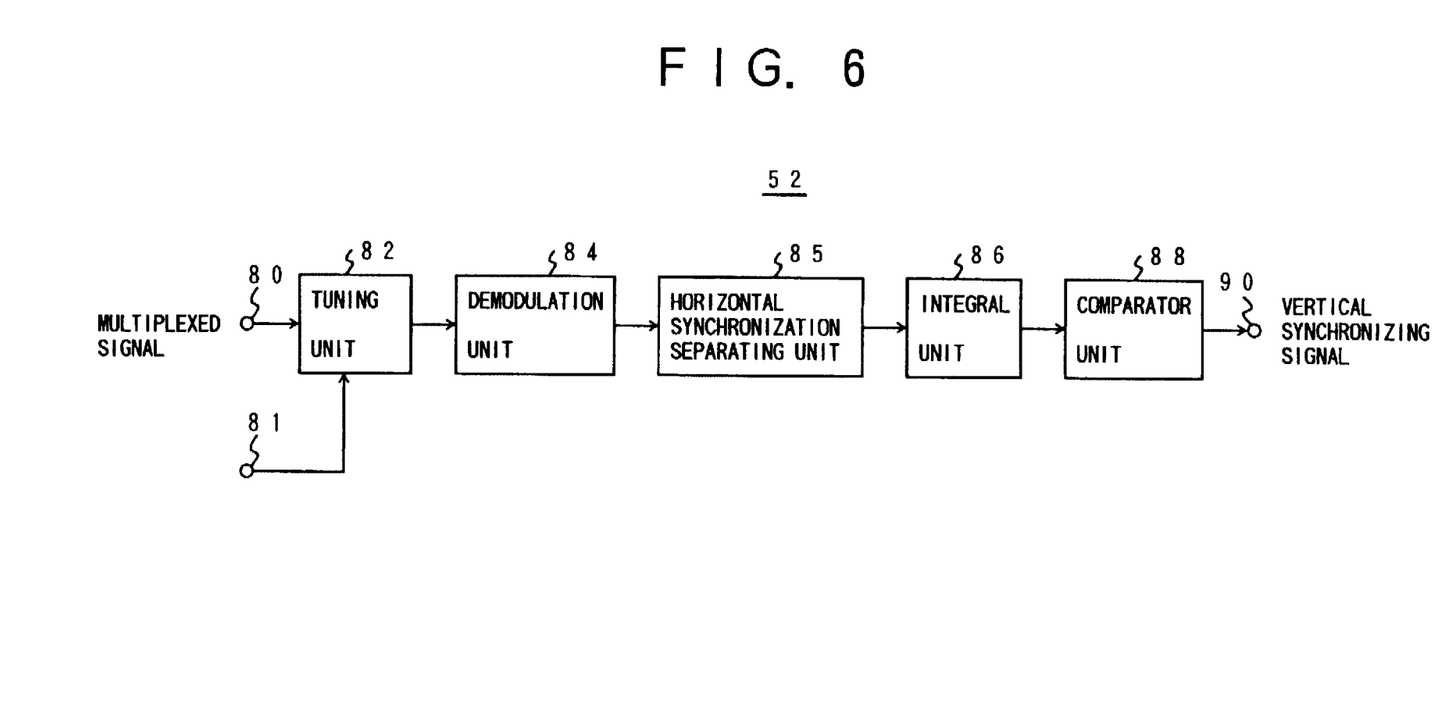
FIG.6 is a block diagram of a vertical synchronization detecting unit of the ONU in FIG.2.

FIG.6 shows a vertical synchronization detecting unit 52 of the ONU 42 in FIG.2. Referring to FIG.6, the frequency division multiplexed signal from the photoelectric conversion unit 48 is input to a terminal 80. An operation signal from the operation unit 54 is input to another terminal 81. A tuning unit 82 selects a modulated signal, tuned to a specific frequency band (channel), from the frequency division multiplexed signal from the terminal 80. The frequency band for the modulated signal is specified by the operation signal from the terminal 81.

A demodulation unit 84 demodulates the selected modulated signal from the tuning unit 82 to produce a video signal, and the demodulation unit 84 outputs the video signal to a horizontal synchronization separating unit 85. The horizontal synchronization separating unit 85 separates horizontal synchronizing signals from the video signal from the demodulation unit 84. An integral unit 86 generates an integral signal from the horizontal synchronizing signals from the horizontal synchronization separating unit 85.

A comparator unit 88 compares the integral signal from the integral unit 86 with a reference level, and outputs a vertical synchronizing signal to a terminal 90 when the integral signal is above the reference level. The vertical synchronizing signal has a predetermined pulsewidth, and it is output from the comparator 88 at a time of the vertical synchronization within a vertical blanking period. This vertical synchronizing signal is transferred from the terminal 90 to the signal transmitting unit 58.

Figure 7:
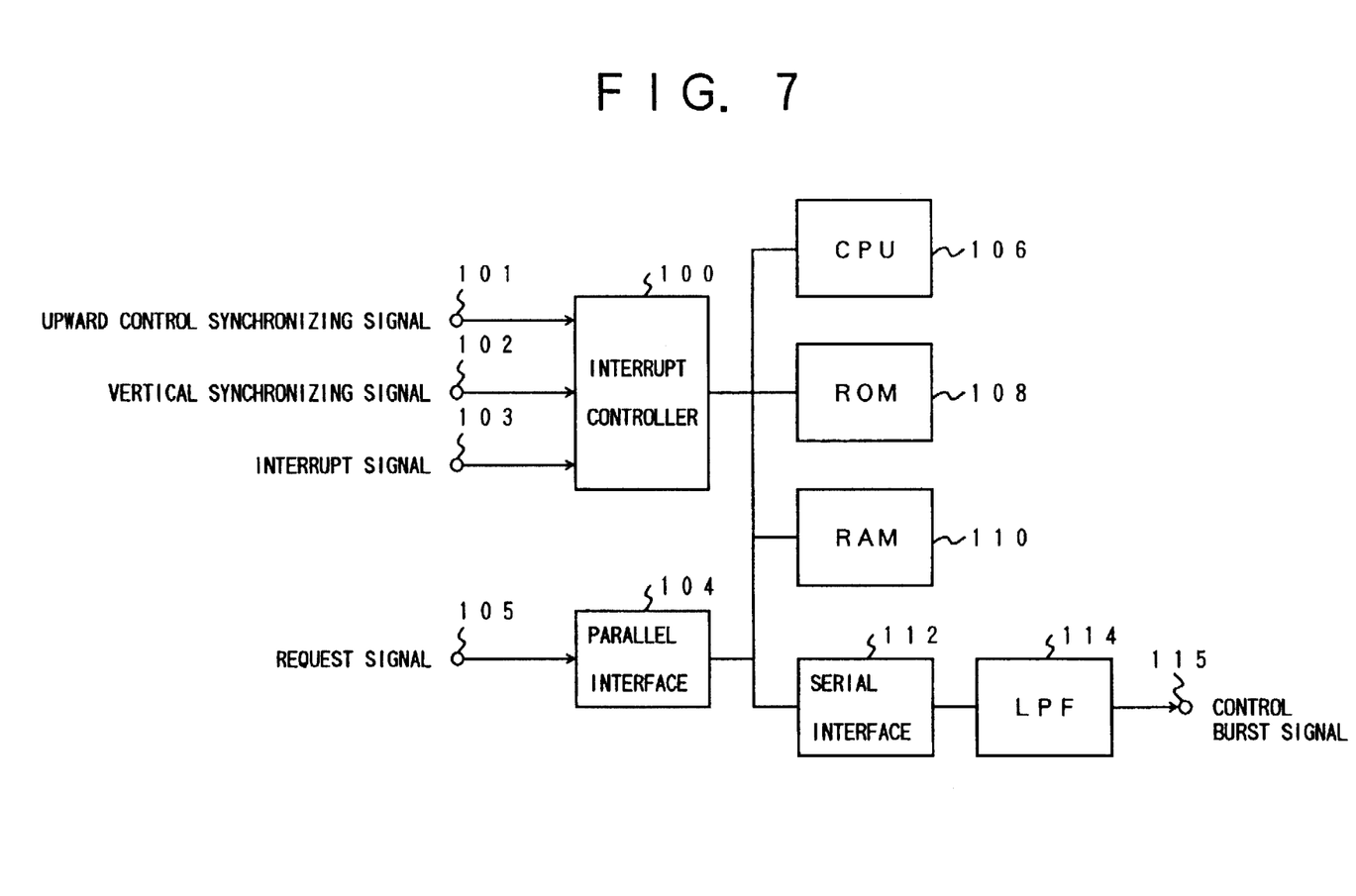
FIG.7 is a block diagram of a control signal generating unit and a signal transmitting unit of the ONU in FIG.2.

FIG.7 shows a control signal generating unit 56 and a signal transmitting unit 58 of the ONU 42 in FIG.2. These units of the ONU 42 are constructed using a microcomputer. Referring to FIG.7, an interrupt controller 100 has a terminal 101 from which the upward control synchronizing signal is input, a terminal 102 from which the vertical synchronization signal is input, and a terminal 103 from which an interrupt signal from the operation unit 54 is input. A parallel interface 104 has a terminal 105 from which a request signal from the operation unit 54 is input.

A CPU (central processing unit) 106 executes a program stored in a ROM (read only memory) 108. A RAM (random access memory) 110 provides memory locations which are used as work areas when the program is executed by the CPU 106.

The interrupt controller 100 issues an interrupt to the CPU 106 when the upward control synchronizing signal from the terminal 101 is received. At this time, the CPU 106 resets a count value to zero.

Also, the interrupt controller 100 issues an interrupt to the CPU 106 when the vertical synchronization signal from the terminal 102 is received. At this time, the CPU 106 increments the count value in accordance with each vertical synchronization signal on the terminal 102.

Also, the interrupt controller 100 issues an interrupt to the CPU 106 when the interrupt signal from the terminal 103 is received. At this time, the CPU 106 reads the request signal which was supplied from the operation unit 54 to the parallel interface 104, and stores the request signal in the RAM 110. The CPU 106 generates a control signal from the request signal stored in the RAM 110.

Figure 8:
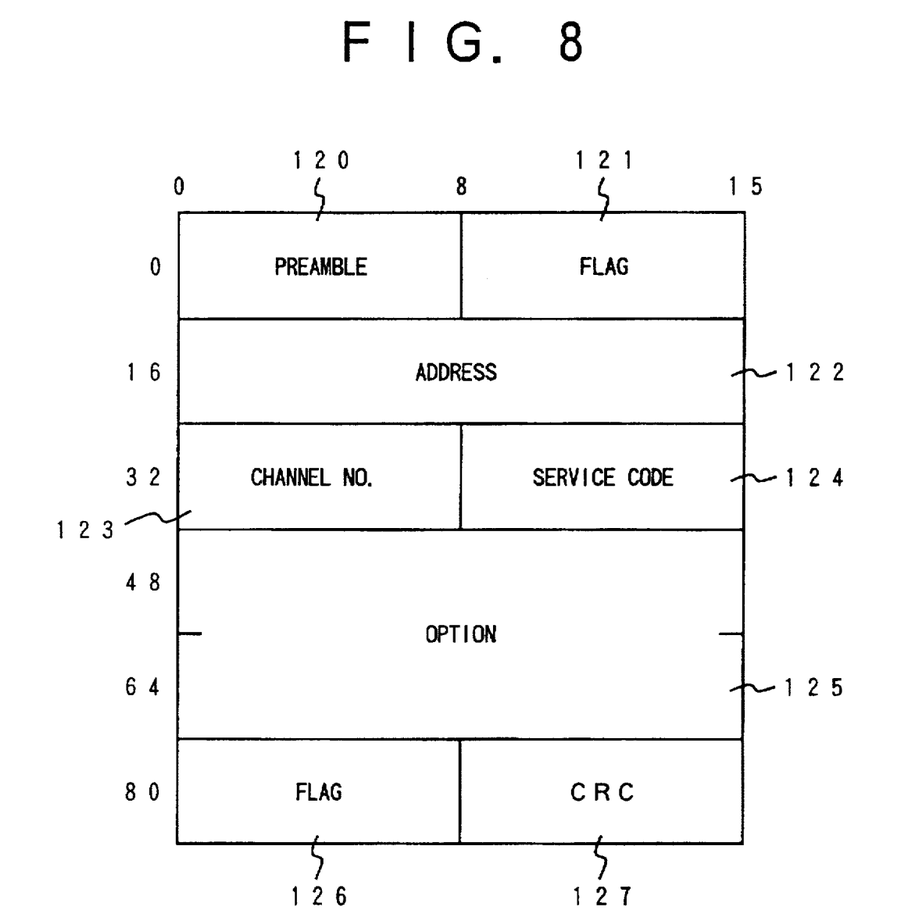
FIG.8 is a diagram showing a format of a control signal from the control signal generating unit in FIG.7.

FIG.8 shows a format of a control signal generated by the control signal generating unit (the CPU 106 in FIG.7). Referring to FIG.8, this control signal has a total length of 12 bytes (=96 bits). The control signal includes a 1-byte preamble 120 which is a bit field used to detect synchronization. The control signal includes a control frame, and a 1-byte flag 121 at the beginning of the control frame and a 1-byte flag 126 at the end of the control frame are included.

In the control signal, shown in FIG.8, a 2-byte address field 122 is a subscriber identification number to identify a subscriber who has made a request to the CATV station 20. A 1-byte channel number field 123 is a channel number included in the request of the subscriber.

A 1-byte service code field 124 in the above control signal is a control code of the video-on-demand service which is instructed by the subscriber to the CATV station 20. For example, the content of the control code is predetermined as follows: "0" is a stop command, "1" is a stop cancel command, "2" is a forward command, "3" is a rearward command, "4" is a video-on-demand menu return command, and "5" is a video-on-demand menu select command.

A 4-byte options field 125 in the above control signal is an option descriptor field. For example, a speed selection when the control code "2" or "3" is specified in the service code field 124, or a menu number selection when the control code "5" is specified in the service code field 124 is included in this option field 125. A 1-byte CRC (cyclic redundancy check) field 127 is an error detection code to check if an error of the control frame of the control signal has occurred.

After the above-mentioned control signal is generated, the CPU 106 generates a digital NRZ (non-return to zero) signal from the control signal when the count value matches with a predetermined value of the individual subscriber terminal stored in the ROM 108. This NRZ signal is serially transmitted from the signal transmitting unit 58 as the control burst signal via a serial interface 112. The frequency of the NRZ signal from the serial interface 112 is restricted below 50 MHz (megahertz) by a lowpass filter (LPF) 114. The control burst signal from the LPF 114 is output from an output terminal 115 to the photoelectric conversion unit 48.

Figure 9:
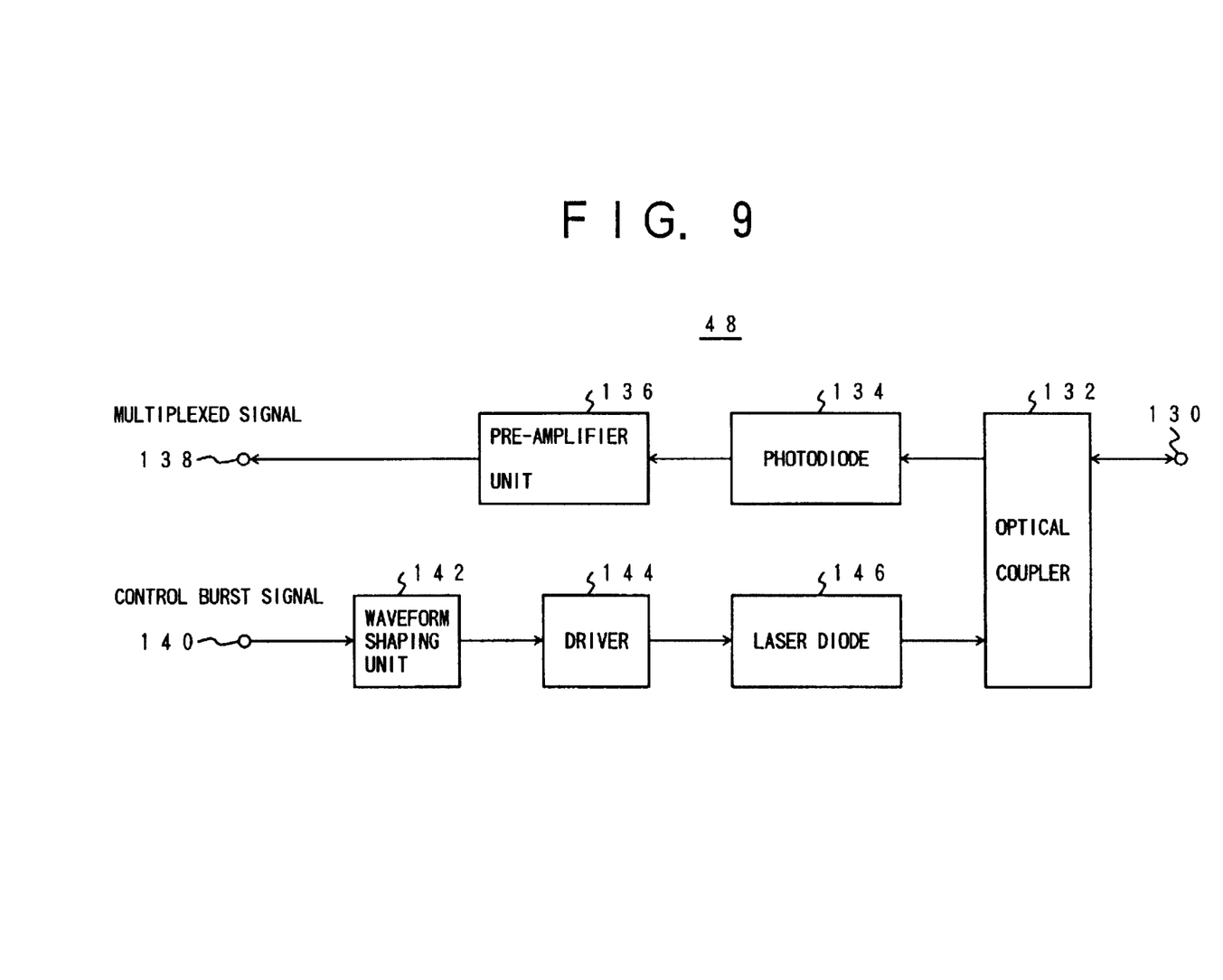
FIG.9 is a block diagram of a photoelectric conversion unit of the ONU in FIG.2.

FIG.9 shows a photoelectric converter unit 48 of the ONU 42 in FIG.2. Referring to FIG.9, the downward optical signal from the optical star coupler 36 is input to a terminal 130. The downward optical signal from the terminal 130 is supplied to a photodiode 134 via an optical coupler 132. The photodiode 134 converts the downward optical signal into an electric multiplexed signal. The multiplexed signal from the photodiode 134 is amplified by a pre-amplifier unit 136, and the amplified multiplexed signal from the pre-amplifier unit 136 is output from a terminal 138.

The control burst signal sent by the signal transmitting unit 58 is input from a terminal 140 to the photoelectric conversion unit 48. The waveform of the control burst signal is shaped by a waveform shaping unit 142. The control burst signal from the waveform shaping unit 142 is sent to a laser diode 146 via a driver 144. The laser diode 146 converts the electric control burst signal into an optical signal. This optical signal from the laser diode 146 is supplied to the terminal 130 via the optical coupler 132. The optical signal is output as the upward optical signal from the terminal 130 to the optical star coupler 36.

Figure 10A:
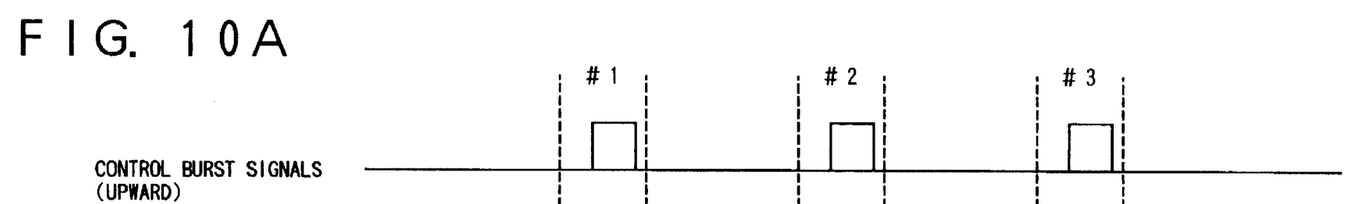
FIGS.10A, 10B and 10C are timing charts for explaining timing of transmission of control burst signals.
Figure 10B:
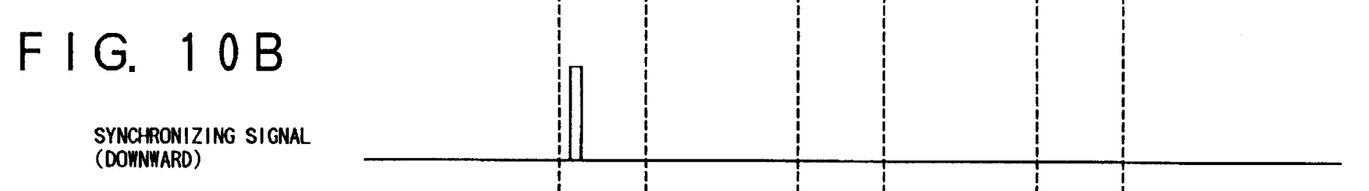
Figure 10C:
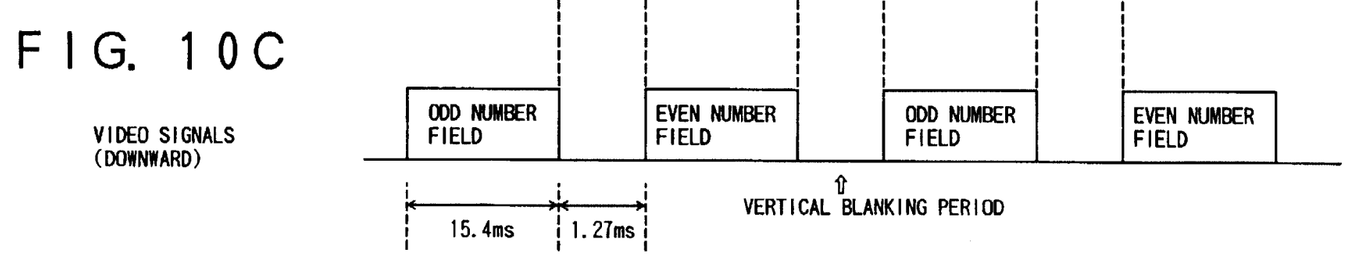

In the above embodiment, as shown in FIGS.1 and 2, the vertical synchronizations of the video signals included in the frequency division multiplexed (FDM) signal are in accordance with each other, as shown in FIG.10C. The FDM signal is transmitted on the optical transmission line from the CATV station 20 to the subscriber terminals. The downward control synchronizing signal is included in the FDM signal at a location corresponding to a vertical blanking period of the video signals included in the FDM signal, as shown in FIG.10OB. By using the received downward control synchronizing signal as the reference, the subscriber terminals transmit the control burst signal at separate vertical blanking periods of the video signals included in the FDM signal.

The control burst signals in FIG.10A are labeled "#1", "#2" and "#3", which indicate the terminal numbers of the subscriber terminals.

In the above-described embodiment, the video signals (the downward signals) and the control burst signals (the upward signals) are multiplexed at frequency divisions, and the control burst signals from the subscriber terminals are transmitted to the CATV station at separate vertical blanking periods of the video signals, as shown in FIGS.10A through 10C. Even if a mixed modulation of the FDM signal including the control burst signals and the video signals takes place, the video-on-demand system of the present embodiment effectively prevents the degradation of the quality of the demodulated video signals on the subscriber terminals.

The amount of transmission data of one frame of the control signal is 1 bits, as shown in FIG.8. When the modulation and transmission of the NRZ signals at a bit rate of 28.8 Mbps is performed, the burst time in such a case is about 3.3 μsec. The delay of the transmission of signals on the optical transmission line 34 per 1 kilometer is about 10 μsec. Since the intervals between the horizontal synchronizations are 64.5 μsec, the control burst signals from the subscriber terminals do not overlap even if the maximum distance of the transmission between the CATV station and the subscriber terminal is about 3 kilometers.

Figure 11A:
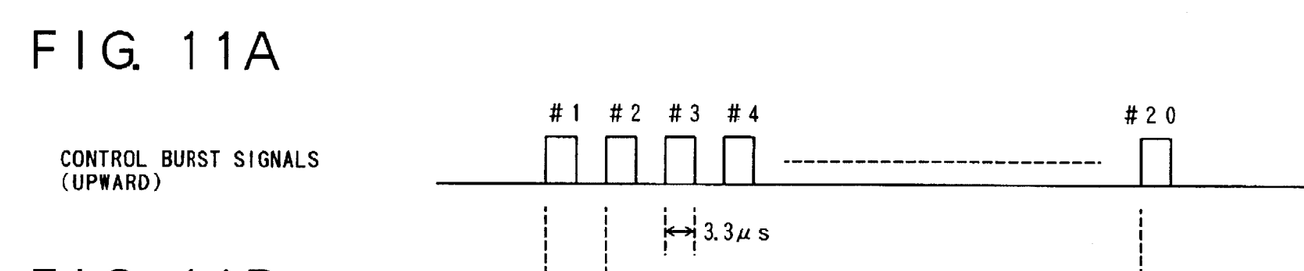
FIGS.11A and 11B are timing charts for explaining timing of transmission of control burst signals.
Figure 11B:
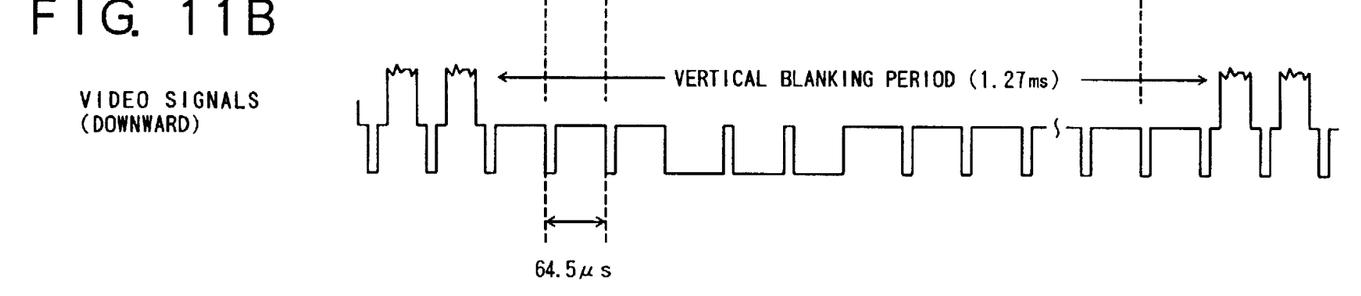

Usually, the maximum distance of the transmission between the CATV station and the subscriber terminal is below 1 kilometer. Thus, the video-on-demand system of the present embodiment effectively prevents the degradation of the quality of the video signals on the subscriber terminals. The above-described embodiment may be modified such that the transmission of control burst signals of about 20 subscriber terminals is allocated to a single vertical blanking period of the video signals included in the FDM signal, as shown in FIGS.11A and 11B.

To realize the above-mentioned modification as another embodiment of the present invention, it is necessary to send the horizontal synchronizing signal from the horizontal synchronization separating unit 85 of the horizontal synchronization detecting unit 52, as well as the vertical synchronizing signal, to the signal transmitting unit 58. Further, it is necessary that the signal transmitting unit 58 determine the timing of the transmission of the control burst signal from that subscriber terminal by counting the horizontal scanning lines to detect the order of the present horizontal scanning line within the vertical blanking period.

In the above-mentioned embodiment, the signal transmitting unit 58 counts horizontal synchronizing signals of the video signals in accordance with the reference indicated by a vertical synchronizing signal of the video signals, and the control signal is transmitted to the CATV station when a count value of the horizontal synchronizing signals reaches a predetermined value.

Accordingly, in the above-mentioned modification, the control burst signals from various subscriber terminals are transmitted during a single vertical blanking period of the video signals of the FDM signal. Therefore, the time that each subscriber terminal continues to wait for a timing of the transmission of the control burst signal from that subscriber terminal can be remarkably reduced.

Further, the present invention is not limited to the above-described embodiment, and variations and modifications may be made without departing from the scope of the present invention.

What is claimed is:

1. A video-on-demand system in which video signals of different channels from a source station are transmitted on an optical transmission line to a plurality of subscriber terminals in accordance with subscriber requests, comprising:

a source station having a plurality of video signal transmitting units and a multiplexing unit, wherein the multiplexing unit generates a frequency division multiplexed signal from the video signals of different channels from the plurality of video signal transmitting units in such a manner that vertical synchronizations of the video signals of different channels are in accordance with each other, said frequency division multiplexed signal from the multiplexing unit being transmitted to each of the plurality of subscriber terminals over the optical fiber transmission line and wherein said source station receives an upstream control signal from each of the plurality of subscriber terminals over the optical fiber transmission line, the upstream control signal having a frequency band different from frequency bands of the video signals of the frequency-division multiplexed signal; and the plurality of subscriber terminals receiving the frequency-division multiplexed signal from the optical fiber transmission line via an optical star coupler, each of the plurality of subscriber terminals having a transmitting unit, each said transmitting unit transmitting the upstream control signal indicative of a subscriber request to the source station over the optical fiber transmission line at a frequency band different from frequency bands of the video signals of the frequency division multiplexed signal, wherein each said transmitting unit transmits the upstream control signal to the source station during a vertical blanking period of the video signals.

2. A video-on-demand system, in which video signals of different channels from a source station are transmitted on an optical transmission line to a number of subscriber terminals in accordance with subscriber requests, comprising:

a multiplexing unit, provided in said source station, generating a frequency division multiplexed signal from the video signals in such a manner that vertical synchronizations of the video signals of different channels are in accordance with each other, and transmitting said frequency division multiplexed signal to each subscriber terminal;

a transmitting unit, provided in each subscriber terminal, transmitting a control signal indicative of a subscriber request to the source station at a frequency band different from frequency bands of the video signals of the frequency division multiplexed signal, said transmitting unit transmitting said control signal during a vertical blanking period of the video signals; and wherein said multiplexing unit multiplexes the video signals of different channels and a control synchronizing signal to generate said frequency division multiplexed signal, said control synchronizing signal indicating a reference for said transmitting unit to count vertical synchronizing signals of the video signals.

3. The video-on-demand system according to claim 2, wherein each said transmitting unit counts vertical synchronizing signals of the video signals in accordance with the reference indicated by the control synchronizing signal which is separated from the frequency division multiplexed signal received from the source station, and said control signal is transmitted to the source station when a count value of the vertical synchronizing signals reaches a predetermined value.

4. A video-on-demand system in which video signals of different channels from a source station are transmitted on an optical transmission line to a number of subscriber terminals in accordance with subscriber requests, comprising:

a multiplexing unit, provided in said source station, generating a frequency division multiplexed signal from the video signals in such a manner that vertical synchronizations of the video signals of different channels are in accordance with each other, and transmitting said frequency division multiplexed signal to each subscriber terminal;

a transmitting unit, provided in each subscriber terminal, transmitting a control signal indicative of a subscriber request to the source station at a frequency band different from frequency bands of the video signals of the frequency division multiplexed signal, said transmitting unit transmitting said control signal during a vertical blanking period of the video signals; and wherein said transmitting unit counts horizontal synchronizing signals of the video signals in accordance with a reference indicated by a vertical synchronizing signal of the video signals, and said control signal is transmitted to the source station when a count value of the horizontal synchronizing signals reaches a predetermined value.

5. The video-on-demand system according to claim 1, wherein a plurality of upstream control signals from the plurality of subscriber terminals are transmitted to the source station over the optical fiber transmission line to the source station at separate vertical blanking periods of the video signals.

6. The video-on-demand system according to claim 1, wherein a plurality of upstream control signals from the plurality of subscriber terminals are transmitted to the service station over the optical transmission line during a single vertical blanking period of the video signals.

7. The video-on-demand system according to claim 1, wherein said vertical blanking period during which the control signal is transmitted by said transmitting unit is specified for the subscriber terminal of said transmitting unit.

* * * * *